(12) United States Patent
Fukumaru et al.

(10) Patent No.: US 8,020,280 B2
(45) Date of Patent: Sep. 20, 2011

(54) ROTOR MANUFACTURING METHOD

(75) Inventors: Kenichiro Fukumaru, Nishikamo-gun (JP); Katsumi Amano, Kitakyushu (JP); Takashi Fukumoto, Kitakyushu (JP); Kazutoshi Ueda, Kitakyushu (JP); Kentaro Haruno, Toyota (JP); Taketo Takeuchi, Nishio (JP); Atsushi Watanabe, Toyota (JP)

(73) Assignees: Toyota Jidosha Kabushiki Kaisha, Toyota-shi (JP); Mitsui High-Tec, Inc., Kitakyushi-shi (JP)

( * ) Notice: Subject to any disclaimer, the term of this patent is extended or adjusted under 35 U.S.C. 154(b) by 505 days.

(21) Appl. No.: 12/223,023

(22) PCT Filed: Feb. 5, 2007

(86) PCT No.: PCT/IB2007/052425
§ 371 (c)(1),
(2), (4) Date: Jul. 21, 2008

(87) PCT Pub. No.: WO2007/091692
PCT Pub. Date: Aug. 16, 2007

(65) Prior Publication Data
US 2011/0000079 A1 Jan. 6, 2011

(30) Foreign Application Priority Data
Feb. 8, 2006 (JP) .................................. 2006-031415

(51) Int. Cl.
*H02K 15/02* (2006.01)
(52) U.S. Cl. ........... 29/598; 29/596; 29/732; 264/272.2; 310/43
(58) Field of Classification Search ............ 29/596–598, 29/732; 310/154–156, 43, 90; 264/272.2, 264/272.14
See application file for complete search history.

(56) References Cited

U.S. PATENT DOCUMENTS

| | | | | | |
|---|---|---|---|---|---|
| 4,173,822 | A | * | 11/1979 | Futterer et al. .................. | 29/596 |
| 4,835,840 | A | * | 6/1989 | Stokes ............................ | 29/598 |
| 5,038,460 | A | * | 8/1991 | Ide et al. ........................ | 29/596 |
| 6,826,824 | B2 | * | 12/2004 | Hiroyuki et al. ................ | 29/598 |
| 6,891,298 | B2 | | 5/2005 | Gary | |
| 7,262,526 | B2 | * | 8/2007 | Shiga et al. ..................... | 310/43 |
| 7,500,848 | B2 | * | 3/2009 | Maeda et al. ................... | 425/542 |

(Continued)

FOREIGN PATENT DOCUMENTS

EP 1 536 543 A1 6/2005

(Continued)

*Primary Examiner* — Minh Trinh
(74) *Attorney, Agent, or Firm* — Kenyon & Kenyon LLP

(57) ABSTRACT

An object is to provide a rotor manufacturing method capable of reducing a rotor unbalance amount by controlling a magnet arrangement position in a rotor core and improving work efficiency when fixing a magnet to the rotor core by using resin. A lower surface of a rotor core is arranged in a lower mold. A magnet is arranged in a lower mold. A magnet is contained in each of magnet containing holes formed in the rotor core in such a manner that a predetermined space is assumed between an upper surface of the rotor core and an upper surface of the magnet. An upper mold is arranged on the upper surface of the rotor core. The upper mold and the lower mold apply a pressure to the rotor core and a molten resin is supplied with pressure from an internal diameter side via the predetermined space into the plurality of magnet containing holes from respective cylinder arranged in the upper mold. Thus, the magnets are molded by resin while pressing the magnets toward the outer diameter side of the magnet containing holes.

7 Claims, 16 Drawing Sheets

U.S. PATENT DOCUMENTS 7,854,056 B2 * 12/2010 Watanabe et al. ............... 29/598

FOREIGN PATENT DOCUMENTS

| JP | 05-083892 A | 4/1993 |
| JP | 09-294344 A | 11/1997 |
| JP | 11-329814 A | 11/1999 |
| JP | 2000-083334 A | 3/2000 |
| JP | 2001-246638 A | 9/2001 |
| JP | 2001-298887 A | 10/2001 |
| JP | 2002-034187 A | 1/2002 |
| JP | 2003-199303 A | 7/2003 |
| JP | 2004-328963 A | 11/2004 |
| JP | 2005-051826 A | 2/2005 |
| JP | 2005-269804 A | 9/2005 |
| WO | WO 04/001930 A1 | 12/2003 |
| WO | WO 2005/043741 A2 | 5/2005 |

* cited by examiner (AFTER DEMOLDED) | (RESIDUAL RESIN REMOVAL)

ROTOR MANUFACTURING METHOD

CROSS-REFERENCE TO RELATED APPLICATIONS

This is a national phase application filed under 35 U.S.C. 371 of PCT/JP2007/052425 filed on Feb. 5, 2007, which claims the benefit of priority from the prior Japanese Patent Application No. 2006-031415 filed on Feb. 8, 2006, the entire contents of all of which are incorporated herein by reference.

FIELD OF THE INVENTION

The present invention relates to a method of manufacturing a rotor to be used in a motor and more particularly to a method of manufacturing a rotor in which a magnet is fixed to a rotor core with resin.

BACKGROUND OF THE INVENTION

For fixing a magnet to a rotor core of a rotor to be used in a motor, there is a method of fixing the magnet to the rotor core with resin. One of such techniques of fixing the magnet with resin is disclosed in for example JP2001-298887A. In this technique, as shown in FIGS. 20 and 21, a rotor 101 is configured such magnets 111 are fixed to a rotor core 112 with resin supplied between adjacent ones of the magnets 111. FIG. 20 is an external perspective view of the rotor 101 disclosed in JP2001-298887A. FIG. 21 is an exploded perspective view of the rotor 101 in which resin 113 has not been injected yet.

In the above prior art, however, even though both end portions of each magnet 111 in a circumferential direction are fixed with resin, a central portion 111a of each magnet 111 in the circumferential direction is not fixed with resin. Stress by a centrifugal force generated by rotation of the rotor 101 is therefore liable to concentrate on resin portions existing in both end portions of each magnet 111 in the circumferential direction. Accordingly, the magnet 111 is retained insufficiently with resin and thus may fall out of the rotor core, 112 which may be broken by stress concentration.

To prevent the above defects, a rotor 201 shown in FIG. 22 is provided. FIG. 22 is a sectional view of a hollow cylindrical rotor core 212 made of laminated electromagnetic steel sheets, viewed in a radial direction thereof. This rotor 201 is also configured such that magnets 211 are fixed to the rotor core 212 with resin 213. Specifically, as shown in FIG. 22, a plurality of slots 212s is arranged at predetermined pitches in a circumferential direction. Each slot 212s is a through hole for insertion of the magnet 211 in the rotor core 212. Molten resin 213 is supplied into each slot 212s from each cylinder and is solidified in each slot 212s, fixing the magnet 211. Thus, the magnet 211 could be prevented from fall out of the rotor core 212.

However, if it is insufficient to control the amount of resin 213 to be filled, some portions unfilled with resin 213 may be formed and the filling amount of resin 213 may become different by site, and so on. In this case, the positions of the magnets 211 in each slot 212s are liable to vary from slot to slot, resulting in a large unbalance amount of the rotor.

Even if the filling amount of resin 213 is sufficiently controlled, the positions of the magnets 211 in each slot 212s are not controlled at all. Mere sufficient control of the filling amount of resin 213 is likely to cause different positions of magnets 211 between slots 212s and thus increase the rotor unbalance amount. Until now, actually, no consideration has been given to the arrangement (fixing) positions of the magnets 211 in each slot 212s in the rotor 201 shown in FIG. 22.

For fixing the magnets 211 in each slot 212s with resin 213, as mentioned above, the molten resin 213 is supplied into each slot 212s from each cylinder. Therefore, the resin has to be charged into a number of cylinders, which is low in work efficiency.

SUMMARY OF INVENTION

The present invention has been made to solve the above problems and has a purpose to provide a rotor manufacturing method including controlling arrangement positions of magnets in a rotor core to reduce a rotor unbalance amount and improve a work efficiency in fixing the magnets to the rotor core with resin.

According to the invention to solve the above problems, there is provided a rotor manufacturing method comprising: a preparation step of placing a lower surface of a hollow cylindrical rotor core on a lower mold, the rotor core being made of a plurality of electromagnetic steel sheets formed with dowels and laminated with the dowels being engaged with each other; an insertion step of inserting magnets in a plurality of magnet containing holes axially formed through the rotor core so that a predetermined space is provided between an upper surface of the rotor core and an upper surface of each magnet; and a molding step of placing an upper mold on the upper surface of the rotor core to allow communication between a lower end of each cylinder provided in the upper mold and the magnet containing hole through a communication path formed in a lower surface of the upper mold, pressurizing the rotor core by the upper and lower molds, supplying molten resin with pressure from each cylinder into each magnet containing hole through the communication path and the predetermined space, and fixing the magnets in the rotor core by resin molding; wherein the molding step includes supplying the molten resin with pressure from each cylinder of the upper mold into the plurality of magnet containing holes from one of an inner periphery side and an outer periphery side to mold the magnets with the resin while pressing the magnets toward one of the outer periphery side and the inner periphery side in each magnet containing hole.

In this rotor manufacturing method, firstly, in the preparation step, the rotor core is placed on the lower mold, the rotor core being made of the plurality of electromagnetic steel plates each formed with the dowels and laminated with the dowels being engaged with each other. In the magnet inserting step, the magnets are inserted in each magnet containing hole axially formed through the rotor core. At that time, the magnets are inserted in each magnet containing hole to assume the predetermined space between the upper surface of the rotor core and the upper surface of the magnet. In the molding step, successively, the upper mold is placed on the rotor core containing the magnets and the rotor core is pressurized by the upper and lower molds. While the rotor core is pressurized, molten resin is supplied with pressure from the upper mold into each magnet containing hole through the communication path and the predetermined space to fix the magnets to the rotor core by resin molding.

Herein, in the molding step, the molten resin is supplied with pressure from the inner periphery side or the outer periphery side of the magnet containing hole. Accordingly, each magnet is molded with the resin while the magnet is pressed toward the inner periphery side or the outer periphery side of each magnet containing hole. In other words, when the molten resin is supplied with pressure from the inner periphery side of the magnet containing hole, each magnet is molded with the resin while being pressed toward the outer periphery side of each magnet containing hole. Alternatively, when the molten resin is supplied with pressure from the outer periphery side of the magnet containing hole, each magnet is molded with the resin while being pressed toward the inner periphery side of each magnet containing hole. Therefore, the magnets are fixed closer to one of the outer periphery side and the inner periphery side of the magnet containing holes. This makes it possible to reduce positional differences of the magnets between the magnet containing holes, thereby reducing the unbalance amount of the rotor.

In the molding step, the molten resin is supplied with pressure from each cylinder of the upper mold into the plurality of magnet containing holes. It is therefore possible to improve the filling ability of resin with respect to each magnet containing hole (to reduce differences in resin filling amount).

This is because resin supply under stroke control to each magnet containing hole (control for maintaining a supply amount of resin at a constant quantity) may cause insufficient filling of resin in each magnet containing hole depending on differences in size of magnets and magnet containing holes, shapes of the magnet containing holes, and others. Accordingly, the resin has to be supplied to each magnet containing hole under pressure control (control for maintaining supply pressure at a constant level). In the case of the same supply pressure, supplying resin from one cylinder into a plurality of magnet containing holes as in the present invention allows slower supply of resin than in the conventional method conducted by supplying resin from the cylinders to the magnet containing holes in one-to-one correspondence.

Even when resin is supplied from each cylinder to each magnet containing hole, it is possible to supply the resin more slowly by reducing the supply pressure. However, when the supply pressure is a fixed value or less, the filling rate of resin in each magnet containing hole will be extremely decreased (see FIG. 14).

Since molten resin is supplied with pressure from each cylinder to the plurality of magnet containing holes, it is possible to supply resin more slowly under an optimum supply pressure and hence improve the filling ability of resin (to reduce differences in resin filling amount).

Since molten resin is supplied with pressure from each cylinder to the plurality of magnet containing holes, furthermore, the number of cylinders can be reduced than in the conventional method. Thus, the number of resin charging operations to the cylinders can also be reduced, enhancing the work efficiency in rotor manufacture. In addition, the less number of cylinders can achieve a simple structure of the upper mold (and the resin supply device), leading to a reduction in production equipment cost.

Preferably, the molding step includes placing the upper mold on the upper surface of the rotor core so that each cylinder is positioned on each dowel formed in the electromagnetic steel sheets.

Herein, the rotor core is made of the plurality of electromagnetic steel sheets laminated and caulked with the dowels. Accordingly, when the rotor core is pressurized during resin supply, the upper surface of the rotor core may be depressed. This is liable to produce gaps between the upper surface of the rotor core and the lower surface of the cylinder during resin supply to each magnet containing hole, causing resin leakage. Such resin leakage from each cylinder will cause the need for scraping leaked resin after the molding step. The rotor core may be damaged at that time.

However, the dowel portion of the rotor core has a highest density because it is caulked in an axial direction. The upper surface of the rotor core is unlikely to be depressed even when the dowel portion is pressurized. In the present invention, therefore, each cylinder is arranged on each dowel. The upper surface of the rotor core will not be depressed when resin is supplied with pressure to each magnet containing hole, causing no gap between the upper surface of the rotor core and the lower surface of each cylinder. In the molding step, accordingly, resin leakage from each cylinder can be avoided. Consequently, no scraping is needed to remove leaked resin after molding and thus the rotor core will not be damaged.

One electromagnetic steel sheet is provided with a plurality of (generally, eight) dowels arranged in a circle at equal intervals in order to avoid deterioration in magnetic property and ensure fixing strength.

Further, placing each cylinder on each dowel can eliminate the need for processing the lower surface of the mold for escape of the dowels. This can further simplify the structure of the upper mold, leading to a more reduced production equipment cost.

In the rotor manufacturing of the present invention, preferably, the molding step includes supplying molten resin with pressure from each cylinder into each of adjacent magnet containing holes through communication paths branching off from each cylinder, each cylinder being located midway between the adjacent magnet containing holes.

In the case where resin is supplied from one cylinder to one magnet containing hole as in the conventional method, the communication path could not be designed to be longer (see a broke line in FIG. 10). The residual resin after molding has to be removed from a connecting portion between the communication path and the magnet containing hole. To remove the residual resin after molding from the connecting portion between the communication path having a short length and the magnet containing hole, the width of the connecting portion between the communication path and the magnet containing hole has to be narrowed. If the width of this area is narrowed, however, the sectional area of the communication path (resin flow path) is extremely decreased due to the short communication path. This would result in a small pressing force of resin against the magnet contained in the magnet containing hole. The magnet may not appropriately be pressed closer to the outer periphery side or the inner periphery side of the magnet containing hole.

On the other hand, when resin is to be supplied from one cylinder to two adjacent magnet containing holes through the communication paths as in the present invention, the communication path can be designed to be longer (see FIG. 10). This makes it possible to remove the residual resin after molding appropriately without the need for narrowing the width of the connecting portion between the communication path and the magnet containing hole. For example, the communication path may be determined to have a fixed width and a height gradually lowering from a portion near the cylinder so that a portion to be connected to the magnet containing hole is lowest in height. This configuration can minimize the strength of residual resin after molding at a connecting portion between the communication path and the magnet containing hole. The residual resin can therefore be removed easily from the rotor core at that portion.

Since the communication path can be formed to be longer, there is no need for narrowing the width of the connecting portion between the communication path and the magnet containing hole for removal of residual resin. Accordingly, the pressing force of resin against the magnets contained in the magnet containing hole will not be decreased and is sufficient to reliably press the magnets toward the outer periphery side or the inner periphery side.

In the rotor manufacturing of the present invention, preferably, the molding step includes supplying molten resin with pressure into each magnet containing hole from a center portion of the magnet containing hole in a longitudinal direction thereof.

This is because the magnet contained in each magnet containing hole can be reliably pressed toward the outer or inner periphery side of the magnet containing hole when the molten resin is supplied with pressure from the center of each magnet containing hole in the longitudinal direction thereof into each magnet containing hole. This can reduce positional differences of the magnets between the magnet containing holes, thereby reducing the unbalance amount of the rotor.

In the rotor manufacturing of the present invention, preferably, the molding step includes supplying molten resin with pressure from a direction perpendicular to a longitudinal direction of each magnet containing hole.

When the molten resin is supplied with pressure from the center of each magnet containing hole in the longitudinal direction thereof into each magnet containing hole, the magnet contained in each magnet containing hole can be reliably pressed closer to the outer or inner periphery side of each magnet containing hole. However, depending on an acting direction of the pressing force of resin against the magnet, the magnet contained in each magnet containing hole may not be pressed uniformly toward the outer or inner periphery side of the magnet containing hole.

In the present invention, therefore, the molten resin is supplied with pressure from the direction perpendicular to the longitudinal direction of each magnet containing hole, so that the pressing force of molten resin acting on the magnet in each magnet containing hole can be maximized. Accordingly, the magnet contained in each magnet containing hole can be pressed reliably and uniformly toward the outer or inner periphery side of each magnet containing hole. It is therefore possible to reduce positional differences of the magnets between the magnet containing holes, thereby further reducing the unbalance amount of the rotor.

In the rotor manufacturing of the present invention, preferably, the magnet inserting step includes inserting the magnet in the magnet containing hole so that the predetermined space is 0.2 mm or more while the rotor core is pressurized by the upper and lower molds.

In case a predetermined space is not formed between the upper surface of the rotor core and the upper surface of the magnet while the rotor core is pressurized, leading to a less amount of resin supplied onto the upper surface of the magnet, a resin layer may be cracked and the magnet could not be firmly fixed by the resin. Then, the unbalance amount of the rotor would increase.

In the present invention, therefore, the magnet is inserted in each magnet containing hole to provide the predetermined space of 0.2 mm or more when the rotor core is pressurized by the upper and lower molds. This makes it possible to reliably prevent resin cracking (see a solid line in FIG. 11).

Even though resin cracking will less occur as the predetermined space is increased, each magnet has to be decreased in size in order to reliably provide such space. However, a smaller magnet will lower motor output power. As the predetermined space is increased, the pressing force of molten resin against the magnet will be decreased (see the broken line in FIG. 11). To prevent the lowering of motor output power and the decrease in pressing force of resin against the magnet, it is preferable to provide the predetermined space of 0.4 mm or less in the rotor core under pressure by the upper and lower molds.

In the rotor manufacturing of the present invention, preferably, the preparation step includes placing the rotor core on the lower mold so that the lower surface of the rotor core is an end face corresponding to a recessed side of each dowel formed in the electromagnetic steel sheets.

The rotor core is made of the laminated electromagnetic steel sheets that are caulked by engagement of the dowels formed in the electromagnetic steel sheets. Of the end faces of the rotor core, therefore, the end face corresponding to the protruding side of each dowel is heavier than the other end face corresponding to the recessed side of each dowel. Accordingly, in the invention, the rotor core is placed on the lower mold so that the lower surface of the rotor core is the end face corresponding to the recessed side of each dowel formed in the electromagnetic steel sheets. In other words, the end face corresponding to the protruding side of each dowel formed in the electromagnetic steel sheets is placed to face the upper mold while the end face corresponding to the recessed side of each dowel formed in the electromagnetic steel sheets is placed to face the lower mold.

Since the molten resin is supplied with pressure from the upper mold, the magnets are disposed on the end face side corresponding to the recessed side of each dowel and the space is formed on the end face side corresponding to the protruding side of each dowel. Accordingly, the weight unbalance deriving from the dowels in the rotor core can be mitigated, thereby reducing the unbalance amount of the rotor.

DETAILED DESCRIPTION

Figure 1:
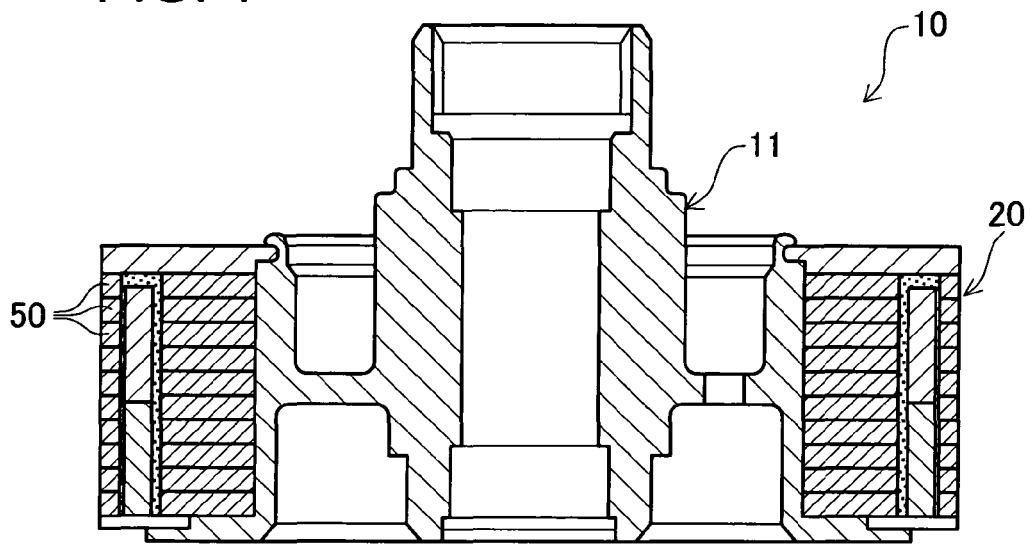
FIG. 1 is a sectional view of a schematic configuration of a rotor.
Figure 2:
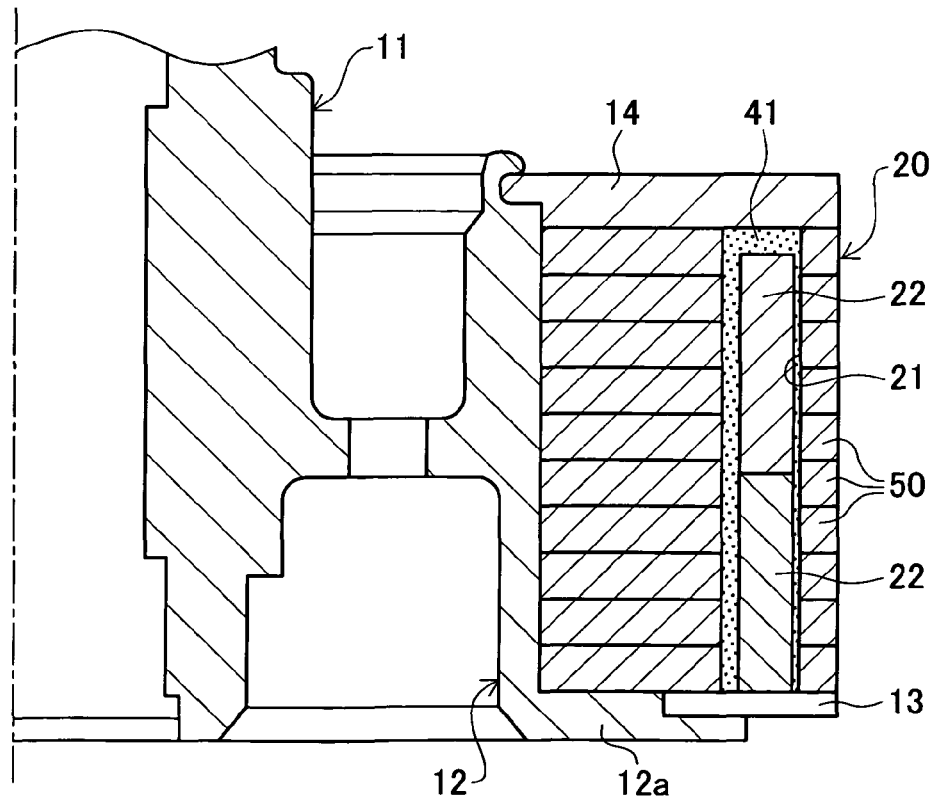
FIG. 2 is a view of a rotor core mounting part in the rotor.

A detailed description of a preferred embodiment of a rotor manufacturing method embodying the present invention will now be given referring to the accompanying drawings. A rotor manufactured by the rotor manufacturing method of the invention will be first explained with reference to FIGS. 1 and 2. FIG. 1 is a sectional view of a schematic configuration of the rotor. FIG. 2 is a view of a rotor core mounting part in the rotor. A rotor 10 includes an annular rotor shaft 11 engageable with a rotary shaft of a motor, and a hollow cylindrical rotor core 20 mounted on the rotor shaft 11. The rotor core 20 is fixedly fitted on an outer periphery of a core holding part 12 of the rotor shaft 11 as shown in FIG. 2. In this state, a lower surface of the rotor core 20 is supported by a flange 12a of the core holding part 12. A magnet end 13 is placed under and around a magnet containing hole 21 formed in the rotor core 20. On the other hand, an upper surface of the rotor core 20 is pressed by an end plate 14. Magnets 22 are fixed in the magnet containing hole 21 of the rotor core 20 by resin.

Figure 3:
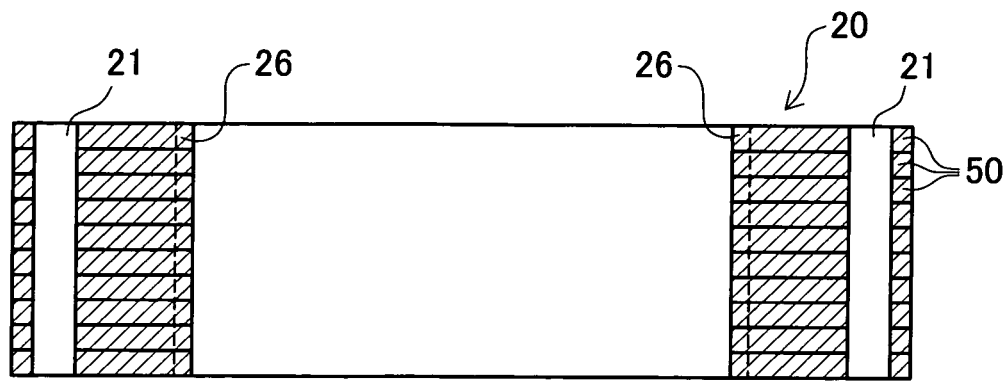
FIG. 3 is a sectional view of a schematic configuration of a rotor core.
Figure 4:
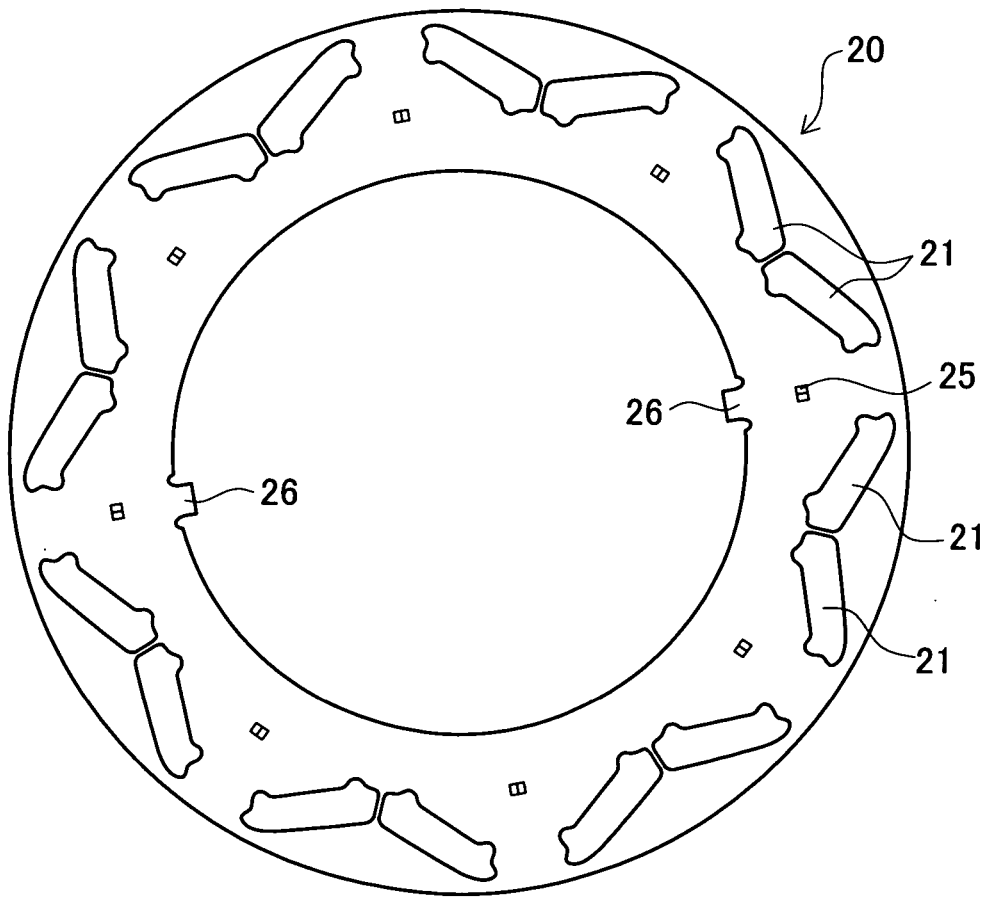
FIG. 4 is a plan view of a schematic configuration of the rotor core.
Figure 5:
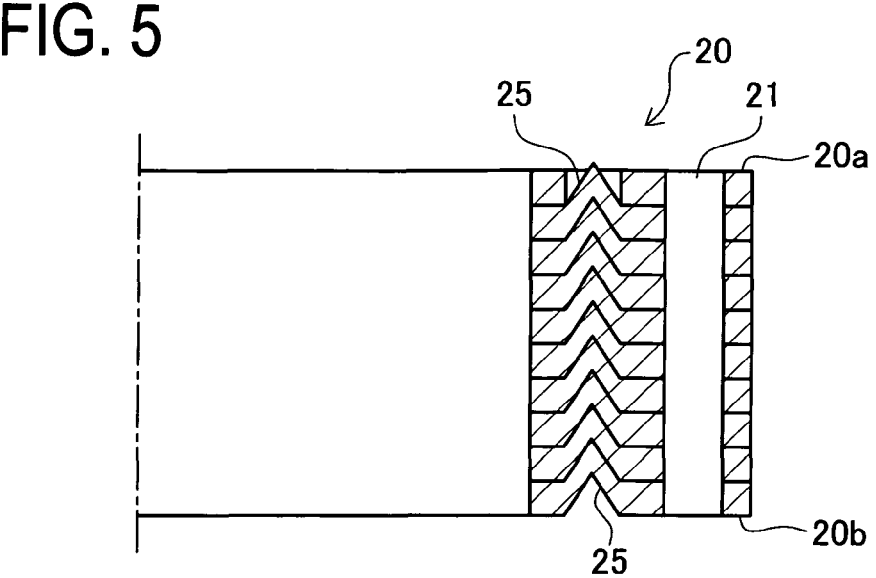
FIG. 5 is a sectional view showing a dowel caulking portion in the rotor core.

Herein, the rotor core 20 (before the magnets are fixed) is explained referring to FIGS. 3 to 5. FIG. 3 is a sectional view showing a schematic configuration of the rotor core. FIG. 4 is a plan view showing the schematic configuration of the rotor core. FIG. 5 is a sectional view showing a dowel caulking portion in the rotor core.

The rotor core 20 is constituted of a plurality of laminated electromagnetic steel sheets 50 shaped in a hollow cylindrical form as shown in FIGS. 3 and 4. Each electromagnetic steel sheet 50 is formed with a dowel 25 as shown in FIG. 5. The dowels 25 are engaged (caulked) with each other so that the electromagnetic steel sheets 50 are made integral in lamination form. Such rotor core 20 is provided with a plurality of magnet containing holes 21 axially formed through the rotor core 20.

In this embodiment, as shown in FIG. 4, total sixteen magnet containing holes 21 are formed. Each electromagnetic steel sheet 50 is provided with eight dowels 25 spaced in a circle at equal intervals in order to avoid deterioration in magnetic property and ensure fixing strength.

As shown in FIGS. 1 and 2, plate-shaped magnets 22 are vertically placed in each magnet containing hole 21 and fixed by resin molding. This magnet fixing method will be mentioned later. It is to be noted that the magnet 22 is a sintered magnet such as a neodymium magnet. With the magnets 22 being fixed by resin in each magnet containing hole 21, the rotor core 20 is fitted on the rotor shaft 11.

Figure 6:
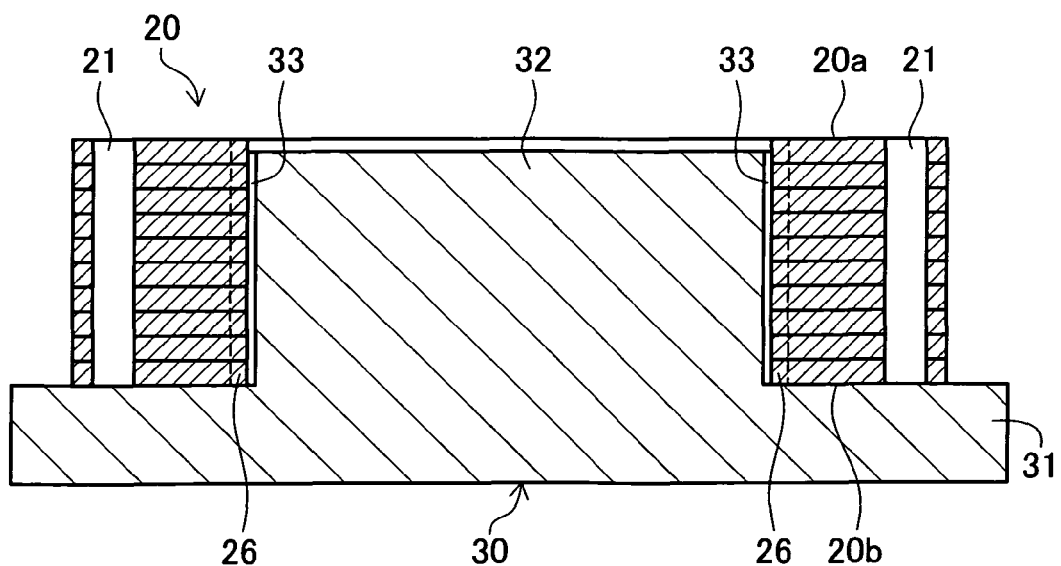
FIG. 6 is an explanatory view showing a state where the rotor core is set on a lower mold.
Figure 7:
FIG. 7 is an explanatory view showing a state where magnets are arranged in containing holes of the rotor core.
Figure 8:
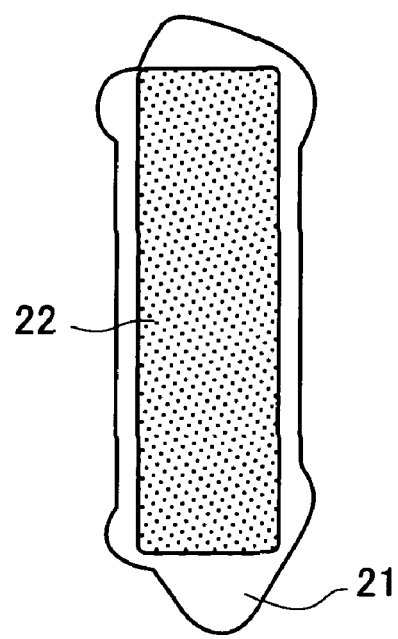
FIG. 8 is an explanatory view showing an arrangement position of the magnet in the containing hole.
Figure 9:
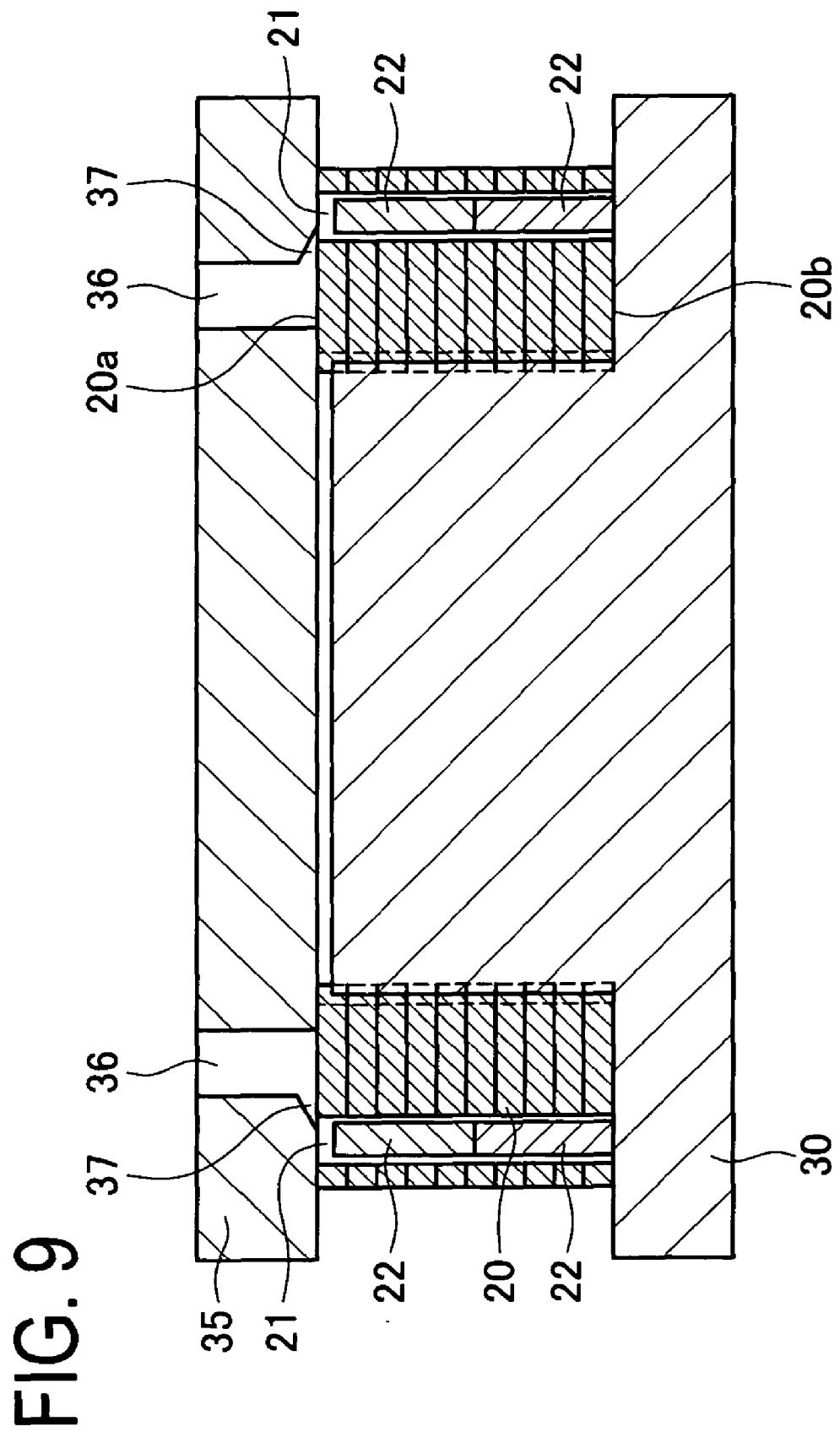
FIG. 9 is an explanatory view showing a state where an upper mold is set on the rotor core.
Figure 10:
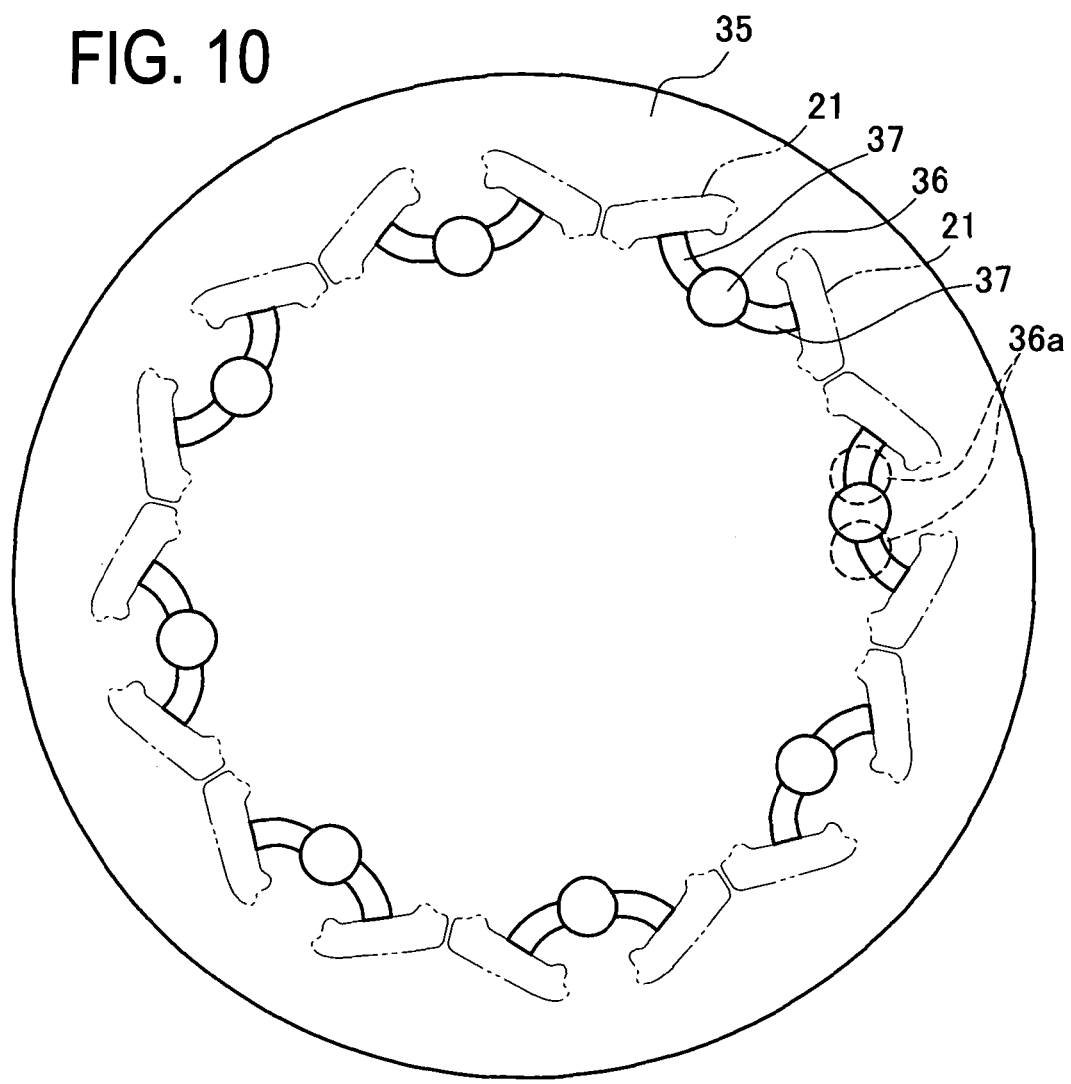
FIG. 10 is a bottom view of the upper mold, viewed from the rotor core side.
Figure 11:
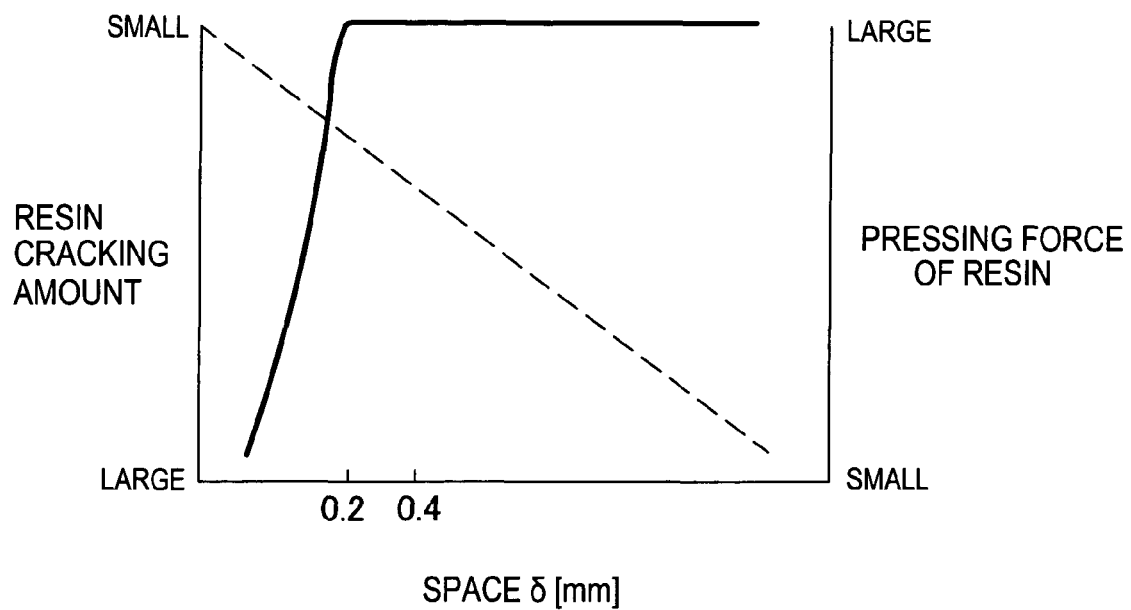
FIG. 11 is a graph showing a relationship between a space on an upper surface of the magnet and a pressing force of resin and a resin cracking amount.
Figure 12:
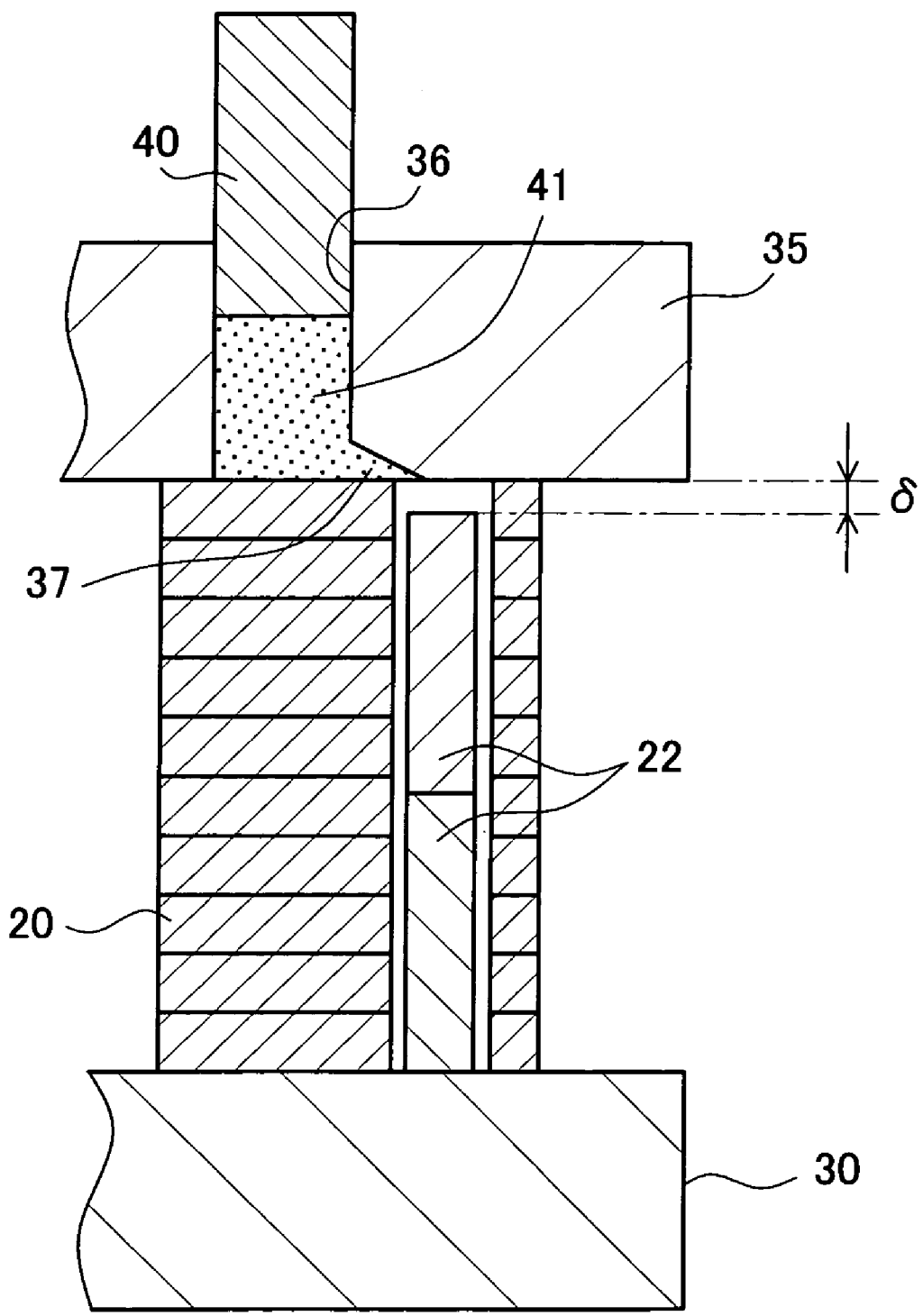
FIG. 12 is an explanatory view showing a state where resin has flowed in a communication path.
Figure 13:
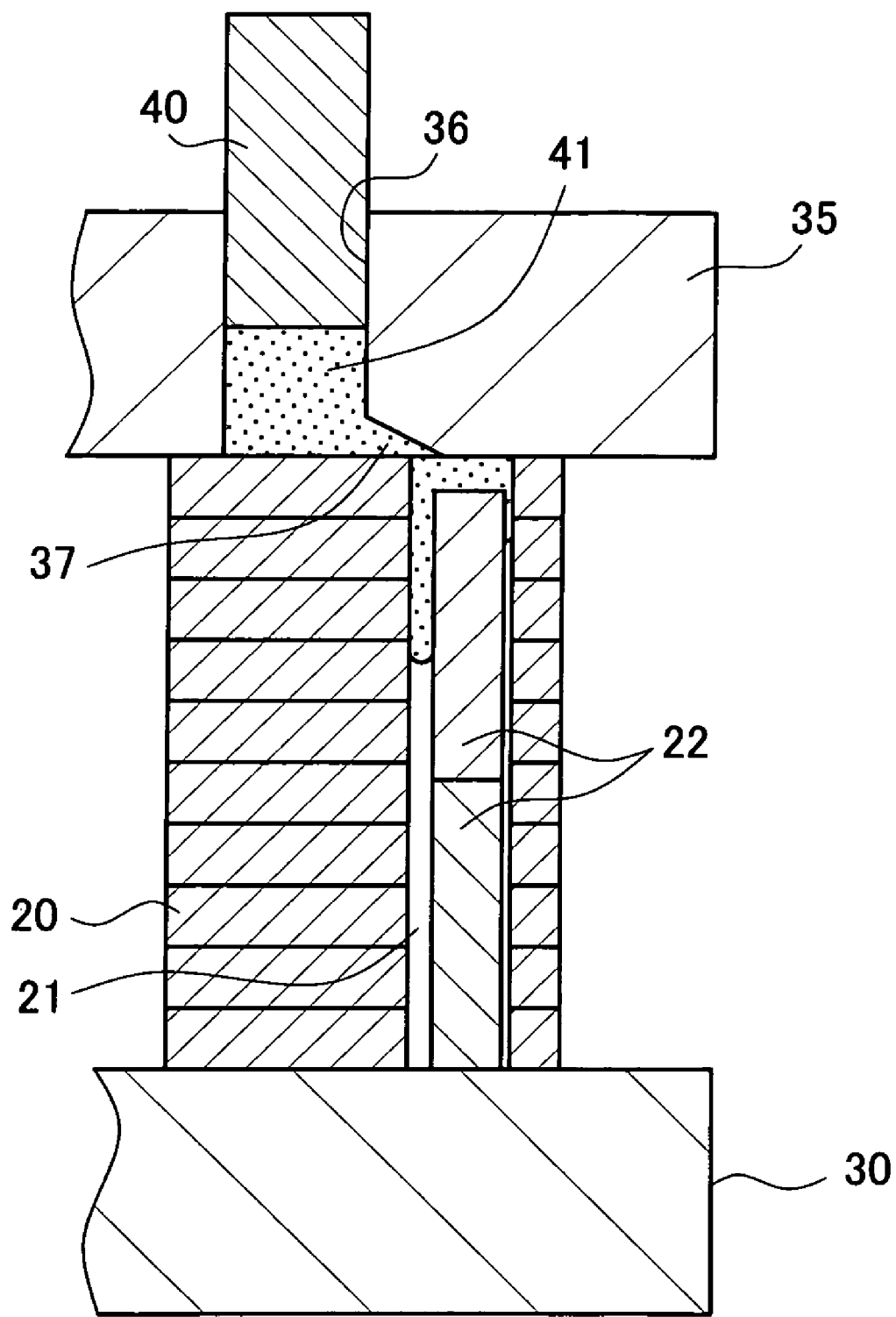
FIG. 13 is an explanatory view showing an intermediate state of the resin flowing in the magnet containing hole.
Figure 14:
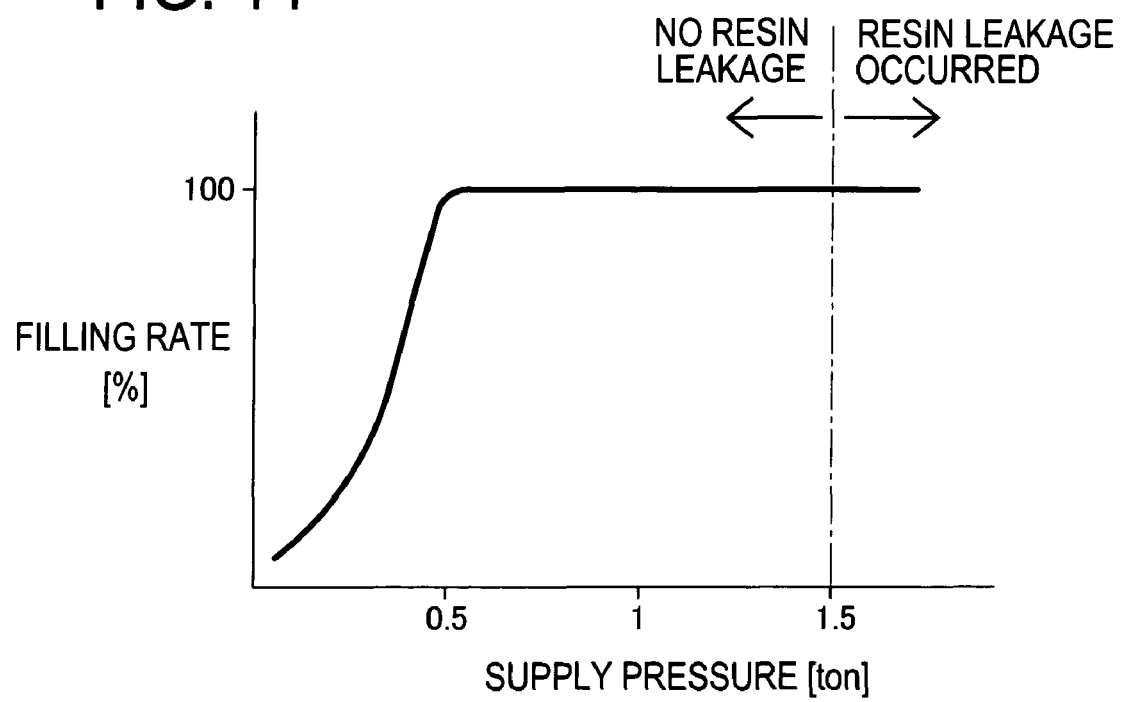
FIG. 14 is a graph showing a relationship between a resin supply pressure and a filling rate.
Figure 15:
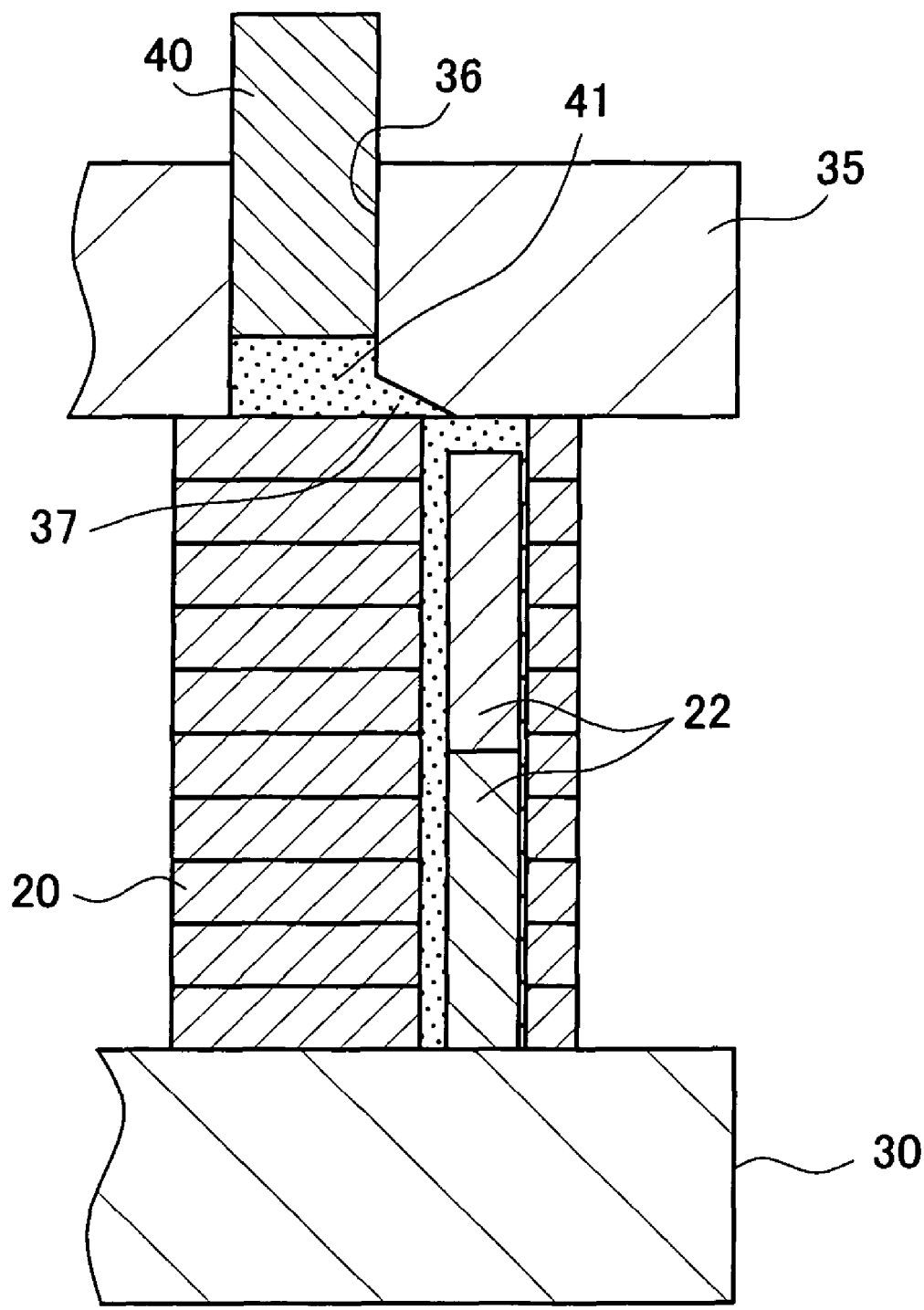
FIG. 15 is an explanatory view showing a state where the resin has been filled in the entire magnet containing hole.
Figure 16:
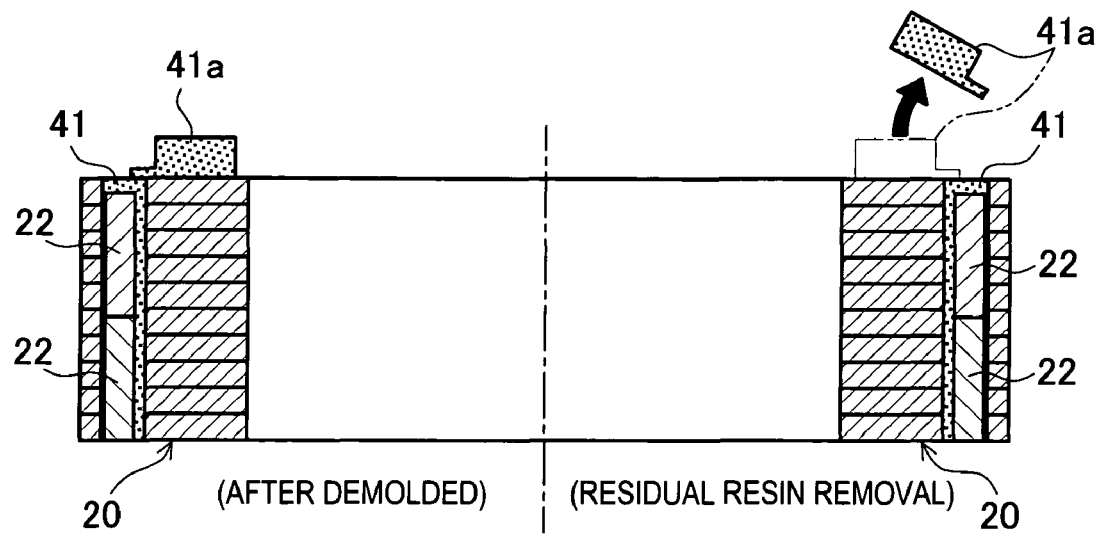
FIG. 16 is an explanatory view showing the rotor core from which the upper and lower molds have already been demounted and a residual resin is being removed.
Figure 17:
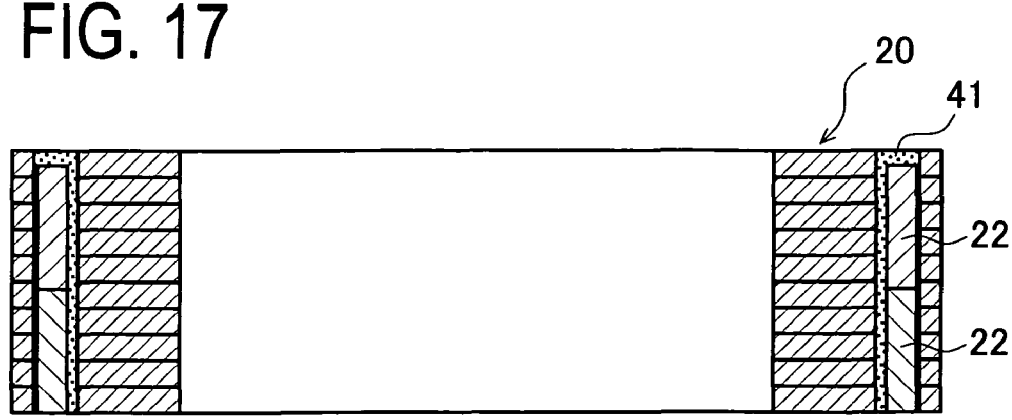
FIG. 17 is a sectional view of the rotor core with the magnets being fixed by resin molding.
Figure 18:
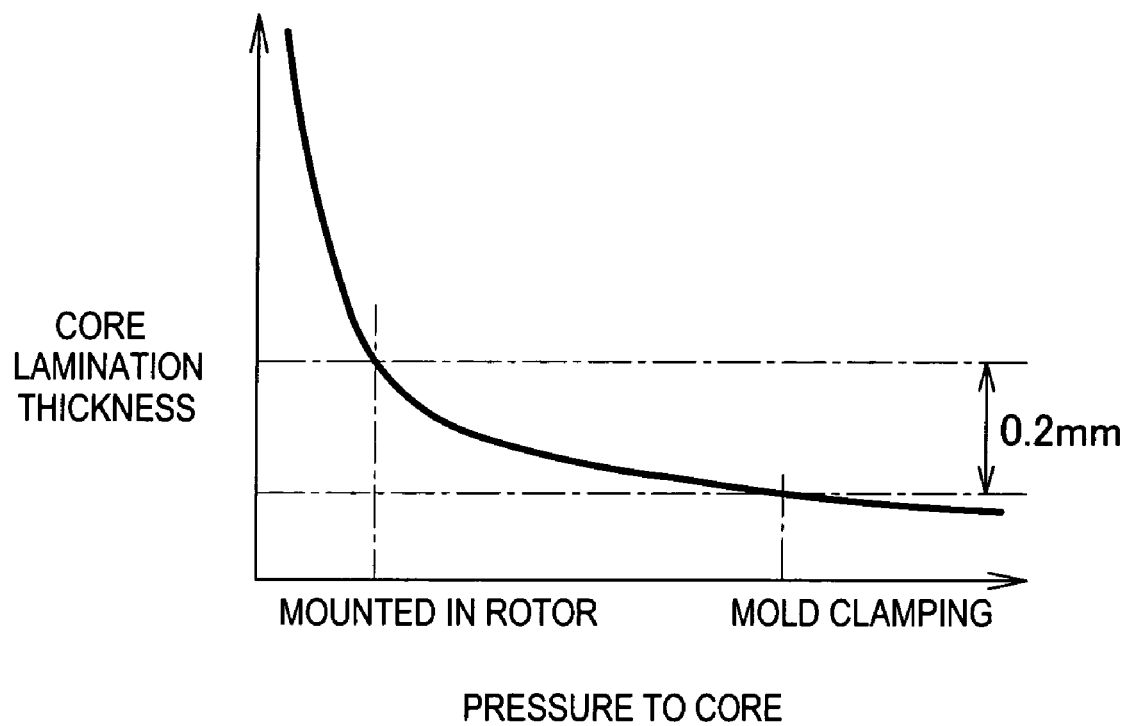
FIG. 18 is a graph showing variations in laminated thickness of the rotor core with respect to a load on the rotor core.

A manufacturing method of the aforementioned rotor 10 will be explained below with reference to FIGS. 6 to 18. FIG. 6 is an explanatory view showing a state where the rotor core is set on a lower mold. FIG. 7 is an explanatory view showing a state where the magnets are arranged in the containing holes of the rotor core. FIG. 8 is an explanatory view showing an arrangement position of the magnet in the containing hole. FIG. 9 is an explanatory view showing a state where an upper mold is set on the rotor core. FIG. 10 is a bottom view of the upper mold, viewed from the rotor core side. FIG. 11 is a graph showing a relationship between a space on an upper surface of the magnet and a pressing force of resin and a resin cracking amount. FIG. 12 is an explanatory view showing a state where resin has flowed in a communication path. FIG. 13 is an explanatory view showing an intermediate state of the resin flowing in the magnet containing hole. FIG. 14 is a graph showing a relationship between a resin supply pressure and a filling rate. FIG. 15 is an explanatory view showing a state where the resin has been filled in the entire magnet containing hole. FIG. 16 is an explanatory view showing the rotor core from which the upper and lower molds have already been demounted and a residual resin is being removed. FIG. 17 is a sectional view of the rotor core with the magnets being fixed by resin molding. FIG. 18 is a graph showing variations in laminated thickness of the rotor core with respect to a load on the rotor core.

Firstly, the rotor core 20 is set on a lower mold 30. Specifically, as shown in FIG. 6, the rotor core 20 is placed on a disc part 31 of the lower mold 30 in such a manner that a hollow part of the rotor core 20 is fitted on a protrusion 32 while a key protrusion 26 formed in the rotor core 20 (each electromagnetic steel sheet 50) is engaged in a key groove 33 formed in the protrusion 32 of the lower mold 30. At that time, the rotor core 20 is disposed on the lower mold 30 so that an end face of the rotor core 20 corresponding to a recessed side of each dowel 25 is a lower surface 20b, i.e., is placed in contact with the lower mold 30. When the rotor core 20 is set on the lower mold 30, a bottom opening of each magnet containing hole 21 is closed.

Successively, the magnets 22 are inserted in each magnet containing hole 21 formed in the rotor core 20. To be more concrete, as shown in FIG. 7, the magnets 22 are vertically arranged one above the other. At that time, the magnets 22 are placed in almost the center of each magnet containing hole 21 as shown in FIG. 8. Further, the magnets 22 are disposed in each magnet containing hole 21 in such a manner that a space is maintained in a range of about 0.2 to 0.4 mm between an upper surface of the upper magnet 22 and an upper surface of the magnet containing hole 21 (the rotor core 20) while the rotor core 20 is pressurized (during resin supply).

Next, as shown in FIG. 9, a disc-shaped upper mold 35 is placed on an upper surface 20a of the rotor core 20 which is an end face corresponding to a protruding side of each dowel 25. Herein, the upper mold 35 is provided with a plurality of cylinders 36. Each cylinder 36 is configured to receive a plunger 40 constituting part of a resin supply device mentioned later. The cylinders 36 are arranged at equal spaced intervals in a circle in the upper mold 35 as shown in FIG. 10 and located between each the magnet containing hole 21 and the hollow part of the rotor core 20 and midway between adjacent magnet containing holes 21 when the upper mold 35 is set on the upper surface 20a of the rotor core 20. As shown in FIGS. 9 and 10, a lower surface of the mold 35 (a contact surface with the upper surface of the rotor core 20 corresponding to the dowel protruding side) is formed with communication paths 37 each of which will provide communication between a lower end of the cylinder 36 and an upper end of the magnet containing hole 21 of the rotor core 20 when the upper mold 35 is set on the upper surface 20a of the rotor core 20.

In this embodiment, as shown in FIG. 10, the upper mold 35 is provided with eight cylinders 36 and, from each cylinder 36, two communication paths 37 branching off. Accordingly, resin will be supplied to two magnet containing holes 21 from one cylinder 36 as mentioned later. The upper mold 35 is thus provided with a less number of cylinders 36 than a conventional method. The upper mold 35 and a resin supply device (the plunger 40 and others) can be made in simple structure, leading to a reduction in production equipment cost.

In this embodiment, further, the cylinders 36 are located midway between the adjacent magnet containing holes 21 to allow resin supply from one cylinder to two adjacent magnet containing holes through the communication paths 37. Accordingly, each communication path 37 can be provided to be longer as compared with a conventional arrangement of cylinders 36a (see a broken line in FIG. 10).

Each communication path 37 is configured to have a constant width and a height gradually lowering from a portion near the cylinder 36 so that a portion to be connected to the magnet containing hole 21 is lowest in height. This configuration can minimize the strength of residual resin at a connecting portion between the communication path 37 and the magnet containing hole 21 after molding. The residual resin can therefore be removed easily from the rotor core 20 at that portion.

Each communication path 37 is formed to become continuous with a center of the magnet containing hole 21 in its longitudinal direction. Furthermore, each communication path 37 is formed so as to connect with the magnet containing hole 21 in a direction perpendicular to the longitudinal direction of the magnet containing hole 21. Because of such formation of the communication path 37, a pressing force of resin acting on the magnets 22 can be maximized when the resin is supplied into the magnet containing hole 21, thereby reliably and uniformly pressing the magnets 22 contained in the magnet containing hole 21 toward an outer periphery side of the magnet containing hole 21.

Moreover, the upper mold 35 is disposed on the upper surface 20a of the rotor core 20 so that each of the eight cylinders 36 of the upper mold 35 is positioned above the dowel 25. This makes it possible to prevent the upper surface 20a of the rotor core 20 from becoming depressed by resin supply. This is because each caulked part of the rotor core 20 corresponding to the dowels 25 in an axial direction has a highest density. Placing each cylinder 36 above each dowel 25 also can eliminate the need for processing the lower surface of the upper mold 35 for escape of the dowels 25.

During resin supply (during resin molding), herein, the aforementioned lower mold 30 and upper mold 35 apply a load of about 6 tons to the rotor core 20. That is, the lower mold 30 and the upper mold 35 are mounted on both end faces of the rotor core 20 in its axial direction and then clamped. The mold clamping with such a very large load is to prevent resin from flowing to any portion other than each magnet containing hole 21. As mentioned above, each cylinder 36 is located on each dowel 25, producing no gap between each cylinder 36 (the upper mold 35) and the rotor core 20, and therefore resin leakage from each cylinder 36 can be prevented reliably.

At that time, the space $\delta$ between the upper surface of the magnet 22 and the upper surface of the rotor core 20 (see FIG. 12) is determined to be about 0.2 mm to 0.4 mm.

Herein, the space $\delta$ is set to be 0.2 mm or more because a space $\delta$ less than 0.2 mm leads to a thin thickness of the upper surface covering the upper magnet 22, sharply increasing a resin cracking amount, as shown by a solid line in FIG. 11. In other words, the space set to be 0.2 mm or more can reduce the resin cracking amount.

On the other hand, the space $\delta$ is also set to be 0.4 mm or less because a pressing force of resin (a force of pressing the magnet 22 toward the outer periphery side of the magnet containing hole 21) lowers as the space $\delta$ increases as shown by a broke line in FIG. 11 and finally could not press the magnet 22 toward the outer periphery side of the magnet containing hole 21. A larger space $\delta$ will need a smaller size of the magnet 22, which may decrease output power of a motor. Accordingly, the space $\delta$ is set to be 0.4 mm or less to prevent decrease in resin pressing force and motor output power.

Consequently, the magnets 22 are arranged in each magnet containing hole 21 so that the space $\delta$ becomes about 0.2 to 0.4 mm when the rotor core 20 is pressurized. It is therefore possible to avoid resin cracking and also prevent decreases in the resin pressing force and the motor output power.

In such a state, resin shaped in pellet form are charged into each cylinder 36 of the upper mold 35 and heated to soften as shown in FIG. 12, and then the resin 41 is injected into the rotor core 20 under a pressure of about 1 ton by the plunger 40. The resin 41 may include an epoxy resin superior in strength such as resistance to vibration with respect to rotation of the rotor.

In this embodiment, unlike the conventional method, no cylinder is provided for each slot (each magnet containing hole) but the common cylinder 36 is provided for the adjacent two magnet containing holes 21. The number of cylinders can be reduced to half, resulting in less resin charging operations into the cylinders 36, and thus work efficiency can be increased.

When the plunger 40 is moved downward as shown in FIG. 13, the resin 41 is caused to flow from the cylinder 36 of the upper mold 35 to the communication path 37 and then into the magnet containing hole 21 in which the magnets 22 have been inserted. Herein, the rotor core 20 is pressurized during resin supply. However, a gap is unlikely to be produced between the cylinder 36 and communication path 37 (the lower surface of the upper mold 35) and the upper surface 20a of the rotor core 20 because each cylinder 36 is located on each dowel 25. The resin 41 supplied under pressure from the cylinder 36 is caused to reliably flow in the magnet containing hole 21 without leaking.

Herein, supplying the resin 41 into the magnet containing hole 21 is conducted under control of pressure (control for maintaining supply pressure at a constant level). The resin supply pressure of 0.5 ton or less would cause a sharp decrease in filling rate and the resin supply pressure of 1.5 tons or more would cause resin leakage, as shown in FIG. 14. In this embodiment, therefore, the resin is supplied under a pressure of about 1 ton as mentioned above.

In this embodiment, the resin 41 is supplied from each cylinder 36 into the two adjacent magnet containing holes 21. Accordingly, in the case of the same resin supply pressure, the resin is allowed to flow more slowly as compared with the conventional method in which resin is supplied from the cylinders to the magnet containing holes in one-to-one correspondence.

Even in the case of supplying resin from each cylinder to each magnet containing hole as in the conventional method, lowering of resin supply pressure allows more slow flow of resin. Specifically, the supply pressure has only to be reduced to about half (about 0.5 ton) in order to achieve a supply speed equal to that in the present embodiment. As mentioned above, however, the supply pressure of 0.5 ton or less is likely to sharply decrease the resin filling rate, leading to insufficient filling of resin.

In the present embodiment, on the other hand, since the resin 41 is supplied from each cylinder 36 into the two adjacent magnet containing holes 21, the resin 41 is allowed to be supplied slowly under appropriate supply pressure into each magnet containing hole 21. This makes it possible to enhance the filling ability of resin 41 into each magnet containing hole 21 (to reduce variations in resin filling).

Furthermore, the communication path 37 is connected to the center of the magnet containing hole 21 in the longitudinal direction from the inner periphery side so that the communication path 37 extends nearly perpendicular to the longitudinal direction of the magnet containing hole 21. Accordingly, the resin 41 flowing in the magnet containing hole 21 through the communication path 37 presses the magnets 22 inserted in the magnet containing hole 21 toward the outer periphery side thereof. At that time, the communication path 37 is connected to the center of the magnet containing hole 21 in the longitudinal direction to extend nearly perpendicular to the longitudinal direction of the magnet containing hole 21 without narrowing the width of the communication path 37. Thus, a large pressing force can be achieved by the resin 41 to uniformly press the magnets 22 toward the outer periphery side.

Subsequently, as shown in FIG. 15, the plunger 40 is further moved downward, causing the resin 41 to fill in clearances in the magnet containing hole 21 while pressing the magnets 22 toward the outer periphery side. The magnets 22 are thus molded by the resin 41. The resin 41 is then cooled and solidified, fixing the magnets 22 in the rotor core 20.

At that time, the magnets 22 as being uniformly placed closer to the outer periphery side of the magnet containing hole 21 are fixed in the magnet containing hole 21 by the resin 41. That is, the thickness of the resin 41 is larger on the inner periphery side than on the outer periphery side in each magnet containing hole 21. This reduces an unbalance amount of the rotor core 20 in the radial direction.

In each magnet containing hole 21, the magnets 22 are fixed closer to the lower surface 20b side of the rotor core 20 (the end face corresponding to a recessed side of each dowel 25). This configuration also reduces the unbalance amount of the rotor core 20 resulting from that the protruding side of each dowel 25, namely, the upper surface 20a side of the rotor core 20 is heavier.

By controlling the arrangement positions of the magnets 22 as above, the rotor core 20 with the resin-molded magnets 22 can have a reduced unbalance amount in the radial and axial directions.

After the resin 41 is solidified, the upper mold 35 and the lower mold 30 are demounted from the rotor core 20 as shown in FIG. 16, and a residual resin 41a remaining on the upper surface 20a of the rotor core 20 is removed. At that time, the portion of the residual resin 41a connecting between the communication path 37 and the magnet containing hole 21 is weakest in strength due to the shape of the communication path 37. The residual resin 41a is accordingly easy to snap at that portion so as to be removed from the rotor core 20. Since no resin leakage from each cylinder 36 and each communication path 37 occurs during molding as mentioned above, a work for scraping away the residual resin is not required and post-treatment after molding is very simple.

After the residual resin 41a is removed as above, the rotor core 20 with a reduced unbalance amount is completed as shown in FIG. 17. The rotor core 20 with the magnets 22 molded with resin is mounted on the rotor shaft 11 by pressing under a load of about 1 ton, completing the rotor 10 as shown in FIG. 1. Subsequently, each magnet 22 is magnetized.

Herein, due to the different loads applied on rotor core 20 between during resin supply (mold clamping) and after the rotor core 20 is mounted on the rotor shaft 11, the laminated thickness of the rotor core 20 varies as shown in FIG. 18. Depending on the variations in laminated thickness of the rotor core, the space δ (see FIG. 12) between the upper surface of the magnet 22 and the upper surface of the rotor core 20 also varies. In this embodiment, specifically, each magnet 22 designed to have a size for providing the space δ of about 0.2 to 0.4 mm during mold clamping is disposed in the magnet containing hole 21. Thus, the space δ in the rotor 10 is about 0.4 to 0.6 mm. In other words, the thickness of the resin 41 existing on the upper surface of the magnet 22 is about 0.4 to 0.6 mm. This makes it possible to reliably prevent resin cracking during rotation of the rotor 10 and hence avoid instable fixing of the magnet 22.

The thus manufactured rotor 10 was subjected to measurement of an unbalance amount (n=21). The result shows an about 55% reduction of the unbalance amount as compared with the rotor explained as the prior art. Even when the conventional processing on the magnet 22 is disused by utilizing the manufacturing method of the present embodiment, the unbalance amount was reduced by about 45% as compared with the rotor explained as the prior art. When the conventional rotor mentioned a the prior art was not subjected to the processing of the magnets, an unbalance amount increased by about 55%.

As obvious from this respect, when the rotor is manufactured by the manufacturing method of the present embodiment, an unbalance amount can be largely reduced even if the processing of each magnet 22 is disused and therefore a rotor manufacturing cost can be reduced.

According to the rotor manufacturing method of the present embodiment described in detail above, when the magnets 22 are to be fixed by resin molding in each magnet containing hole 21 of the rotor core 20, the resin 41 is supplied with pressure through the communication paths 37 branching off from each cylinder 36 of the upper mold 35 into two adjacent magnet containing holes 21 from respective inner periphery sides. Accordingly, each magnet 22 is molded with the resin 41 while being pressed toward the outer periphery side of the magnet containing hole 21. Each magnet 22 is thus fixed closer to the outer periphery side of the magnet containing hole 21. It is therefore possible to reduce positional differences of the magnets 22 between the magnet containing holes 21, thereby reducing the unbalance amount of the rotor 10. Further, the number of cylinders 36 provided in the upper mold 35 can be reduced to half, with the result of a less number of resin charging operations into the cylinders 36, improving the work efficiency.

Figure 19A:
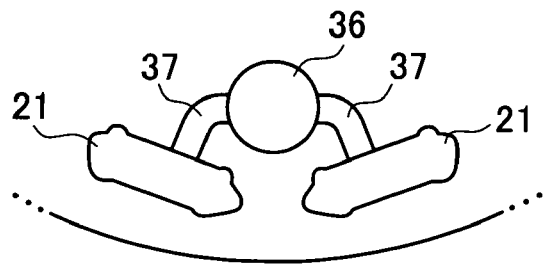
FIG. 19A is a schematic view of a modified form of the communication path in the upper mold.
Figure 19B:
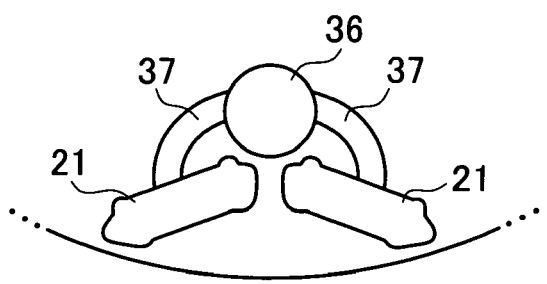
FIG. 19B is a schematic view of another modified form of the communication path in the upper mold.

The above embodiment is merely an example and does not limit the present invention, and the invention may be embodied in other specific forms without departing from the essential characteristics thereof. In the aforementioned embodiment, the arrangement position of each cylinder 36 and the shape of each communication path 37 configure the upper mold 35 as shown in FIG. 19A. The arrangement position of each cylinder 36 and the shape of each communication path 37 are not limited thereto. Specifically, each cylinder 36 may be arranged midway between the magnet containing holes 21 formed like a Japanese character "ハ" when seen from the outer periphery side as shown in FIG. 19B. In this case, each communication path 37 is designed to be perpendicular to the center portion of each magnet containing hole 21 in the longitudinal direction and hence the shape of each communication path 37 is as shown in FIG. 19B.

Figure 19C:
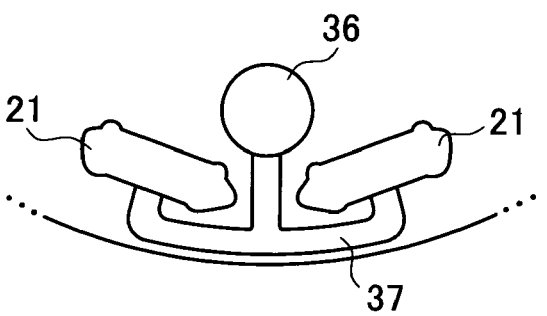
FIG. 19C is a schematic view of another modified form of the communication path in the upper mold.

As to the configurations shown in FIGS. 19A and 19B, resin will be supplied into each magnet containing hole 21 from its inner periphery side. To the contrary, the upper mold 35 may be designed to allow supply of resin into each magnet containing hole 21 from its outer periphery side. It is concretely only necessary to modify the shape of each communication path 37 as shown in FIG. 19C without changing the position of each cylinder 36 shown in FIG. 19A. Accordingly, resin is allowed to be supplied into each magnet containing hole 21 from its outer periphery side.

Figure 19D:
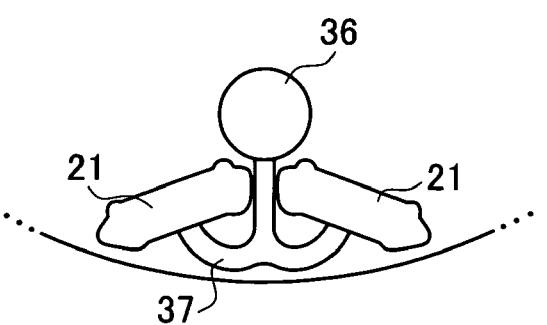
FIG. 19D is a schematic view of another modified form of the communication path in the upper mold.

Alternatively, only the shape of each communication path 37 may be modified as shown in FIG. 19D without changing the position of each cylinder 36 shown in FIG. 19B to allow resin supply into each magnet containing hole 21 from its outer periphery side.

When the magnets 22 are molded with resin in the rotor core 20 by use of the upper mold designed as shown in FIG. 19C or 19D, the magnets 22 are uniformly fixed closer to the inner periphery side of each magnet containing hole 21, opposite to the above embodiment. The rotor using such rotor core can also reduce an unbalance amount as with the aforementioned rotor 10.

Figure 19E:
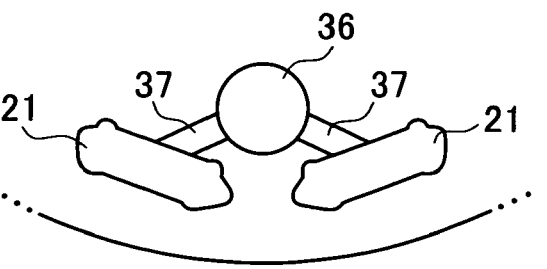
FIG. 19E is a schematic view of another modified form of the communication path in the upper mold.
Figure 20:
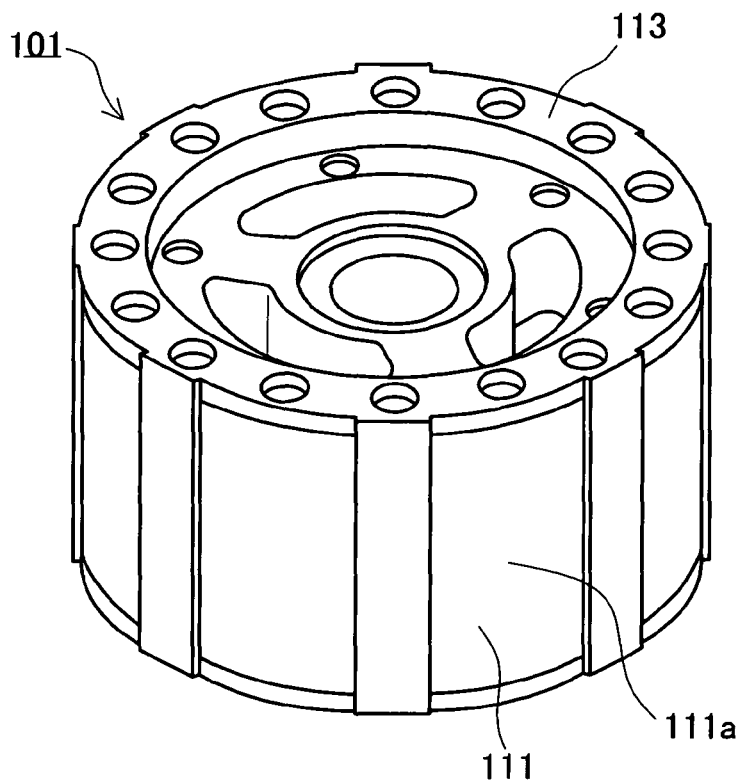
FIG. 20 is an external perspective view of a rotor disclosed in JP2001-298887A.
Figure 21:
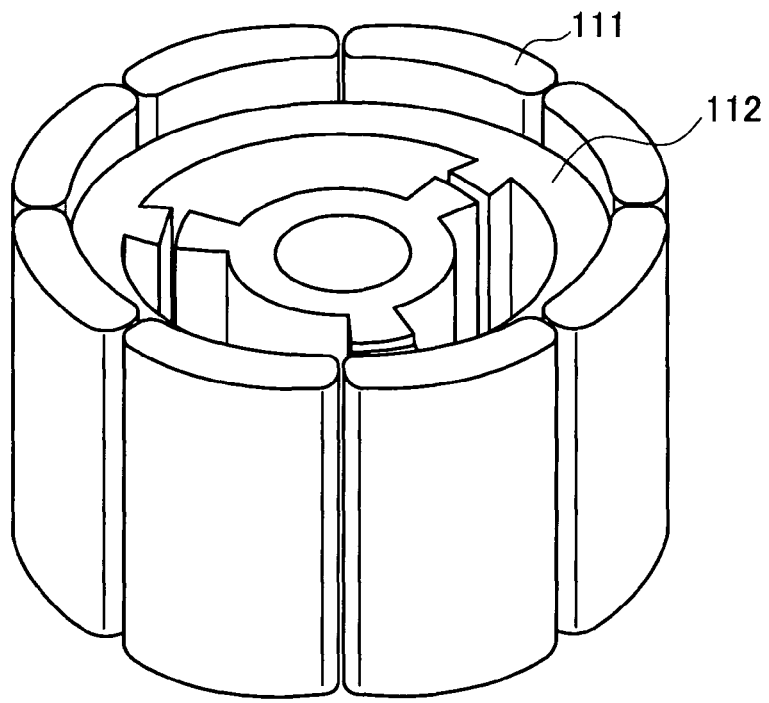
FIG. 21 is an exploded perspective view of the rotor disclosed in JP2001-298887A before resin is supplied.
Figure 22:
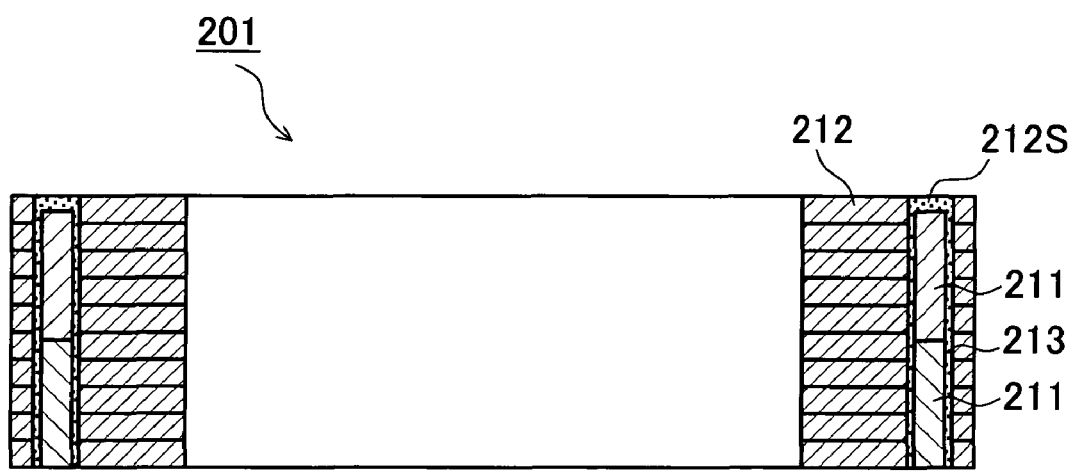
FIG. 22 is a sectional view of a general rotor with magnets fixed with resin in slots.

Moreover, each communication path 37 may be formed in such a shape as to linearly connect the cylinder 36 and each magnet containing hole 21 as shown in FIG. 19E to make the length of each communication path 37 shortest to minimize an amount of residual resin.

INDUSTRIAL APPLICABILITY

According to the rotor manufacturing method of the present invention, molten resin is supplied with pressure from one cylinder to a plurality of magnet containing holes, thereby molding magnets with the resin while pressing the magnets toward the outer periphery side or the inner periphery side of the magnet containing hole. Accordingly, the magnets can be fixed closer to either the outer periphery side or the inner periphery side in the magnet containing hole. Since the upper mold can be designed with less number of cylinders for resin supply, the number of resin charging operations into the cylinders can be reduced, improving the work efficiency.

According to the rotor manufacturing method of the present invention, as above, positional differences of the magnets in the rotor core can be reduced and therefore the unbalance amount of the rotor can be reduced, and the work efficiency in fixing the magnets to the rotor core with resin can be improved.

The invention claimed is:

1. A rotor manufacturing method comprising:
   a preparation step of placing a lower surface of a hollow cylindrical rotor core on a lower mold, the rotor core being made of a plurality of electromagnetic steel sheets formed with dowels and laminated with the dowels being engaged with each other;
   an insertion step of inserting magnets in a plurality of magnet containing holes axially formed through the rotor core so that a predetermined space is provided between an upper surface of the rotor core and an upper surface of each magnet; and
   a molding step of placing an upper mold on the upper surface of the rotor core to allow communication between a lower end of each cylinder provided to extend to a lower surface in the upper mold and the magnet containing hole through a communication path formed in the lower surface of the upper mold, pressurizing the rotor core by the upper and lower molds, pushing molten resin out of each cylinder by a plunger to supply the molten resin with pressure into each magnet containing hole through the communication path and the predetermined space, and fixing the magnets in the rotor core by resin molding;
   wherein the molding step includes supplying the molten resin with pressure from each cylinder of the upper mold into the plurality of magnet containing holes from one of an inner periphery side and an outer periphery side to mold the magnets with the resin while pressing the magnets toward one of the outer periphery side and the inner periphery side in each magnet containing hole.

2. The rotor manufacturing method according to claim 1, wherein
   the molding step includes placing the upper mold on the upper surface of the rotor core so that each cylinder is positioned on each dowel formed in the electromagnetic steel sheets.

3. The rotor manufacturing method according to claim 1, wherein
   the molding step includes supplying molten resin with pressure from each cylinder into each of adjacent magnet containing holes through communication paths branching off from each cylinder, each cylinder being located midway between the adjacent magnet containing holes.

4. The rotor manufacturing method according to claim 1, wherein
   the molding step includes supplying molten resin with pressure into each magnet containing hole from a center portion of the magnet containing hole in a longitudinal direction thereof.

5. The rotor manufacturing method according to claim 1, wherein
   the molding step includes supplying molten resin with pressure from a direction perpendicular to a longitudinal direction of each magnet containing hole.

6. The rotor manufacturing method according to claim 1, wherein
   the magnet inserting step includes inserting the magnet in the magnet containing hole so that the predetermined space is 0.2 mm or more while the rotor core is pressurized by the upper and lower molds.

7. The rotor manufacturing method according to claim 1, wherein
   the preparation step includes placing the rotor core on the lower mold so that the lower surface of the rotor core is an end face corresponding to a recessed side of each dowel formed in the electromagnetic steel sheets.

* * * * *

UNITED STATES PATENT AND TRADEMARK OFFICE
CERTIFICATE OF CORRECTION

PATENT NO. : 8,020,280 B2
APPLICATION NO. : 12/223023
DATED : September 20, 2011
INVENTOR(S) : Kenichiro Fukumaru et al.

It is certified that error appears in the above-identified patent and that said Letters Patent is hereby corrected as shown below:

On the Cover Page, Column 1:

Replace "(86)   PCT No.:    PCT/IB2007/052425"

with    --(86)   PCT No.:    PCT/JP2007/052425--.

Signed and Sealed this
Sixth Day of March, 2012

David J. Kappos
*Director of the United States Patent and Trademark Office*